(No Model.)
C. W. HOLTZER.
ELECTRIC BATTERY.
No. 327,878. Patented Oct. 6, 1885.
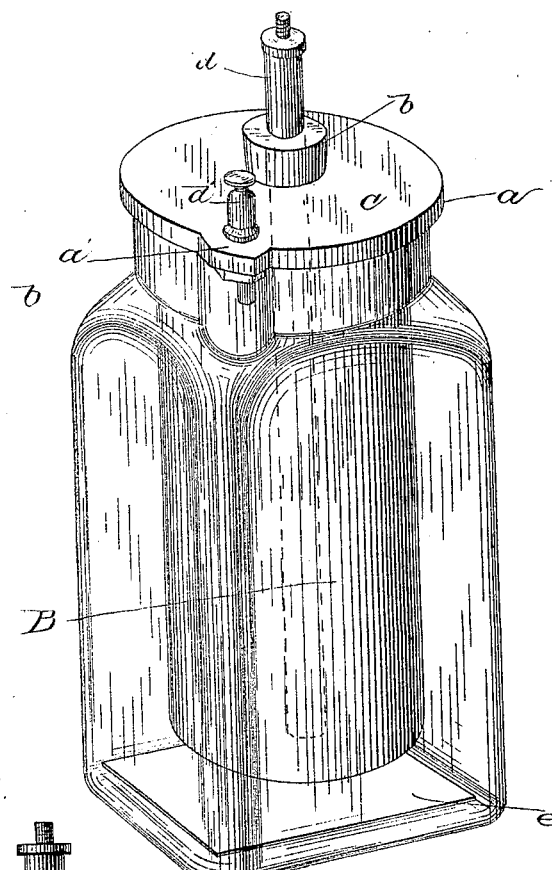
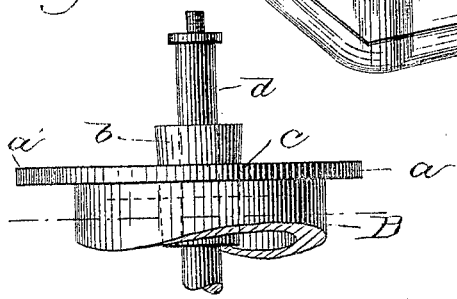
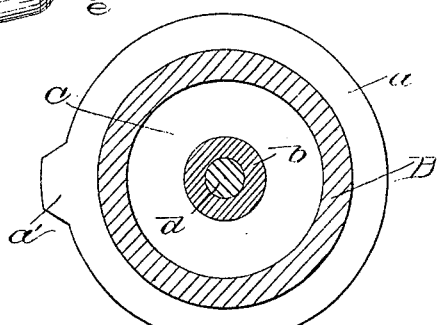
Witnesses
Fred L. Emery.
F. Cutter.
Inventor
Charles W. Holtzer
by Crosby & Gregory
Atty's

UNITED STATES PATENT OFFICE.

CHARLES W. HOLTZER, OF BOSTON, MASSACHUSETTS.

ELECTRIC BATTERY.

SPECIFICATION forming part of Letters Patent No. 327,878, dated October 6, 1885.

Application filed June 22, 1885. Serial No. 169,377. (No model.)

*To all whom it may concern:*

Be it known that I, CHARLES W. HOLTZER, of Boston, (Brookline,) county of Norfolk, State of Massachusetts, have invented an Improvement in Electric Batteries, of which the following description, in connection with the accompanying drawings, is a specification, like letters on the drawings representing like parts.

My invention relates to improvements in that class of batteries known as "agglomerate batteries," and has for its object to produce an efficient battery of fewer parts and more simple construction.

In accordance with my invention, instead of the usual glass cover, the positive carbon rod, and the usual agglomerate plates or blocks fastened to it by rubber bands, and the lead cap attached to the positive carbon outside of the cover and serving to suspend the said carbon within the jar, I employ a negative electrode composed of the usual so-called "agglomerate" material, molded under pressure to form a cup, and a flange to support the cup when placed in position in the usual glass jar. I have also provided the cover of the agglomerated cup with an opening, and the said opening is provided with an insulating bushing or sleeve fitted therein air-tight, and through which the usual zinc rod is extended. The flange of the cup has a projection to cover the bulge in the neck of the jar usually employed in the class of batteries referred to. The under side of the projection referred to has a lug or equivalent to enter the said bulge, the said lug restraining and preventing rotation of the negative electrode.

In the drawings, Figure 1 is a perspective view of my cell. Fig. 2 is a detail view of the electrode. Fig. 3 is a section.

The glass jar A to hold the solution, preferably ammonium chloride, is of the shape common to Leclanché batteries.

My improved negative electrode consists of a cylindrical cup, B, composed of carbon and preferably peroxide of manganese, the cup having a flange to constitute a cover, C, for the jar, the cover being made integral with the cup by molding the carbon and manganese under pressure in a mold, and resting upon the edge or rim of the usual glass jar, A, and supporting the said cup in place within the said jar.

The cover C is provided with a central opening, through which the usual zinc rod, $d$, is extended, the said zinc rod passing through an insulating bushing or sleeve, $b$, shown as a perforated cork which fits air-tight into the said opening, the said insulating bushing or sleeve holding the rod $d$ in its adjusted position within the jar.

The cover is provided with a projection, $a'$, which extends over the bulge or protuberance $b'$, common to the neck of the usual glass jar, through which bulge the zinc rod is commonly extended into the jar. I have extended the spindle of the binding-screw $d'$ through the said projection $a'$, and have secured to the said spindle a nut or other similar device, which serves to prevent rotation of the cup and its attached parts. I have also placed upon the bottom of the jar A a sheet of zinc, $e$, which entirely prevents the deposition of the impurities of the solution upon the zinc rod, the said impurities being deposited upon the plate $e$, thereby maintaining a constant action of the battery.

The negative electrode, such as herein described, molded into shape and made substantially of one piece, is very strong and durable, and may be handled without fear of separation, and the placing of the zinc rod at the center of the negative electrode makes a more compact arrangement of parts. By employing a negative electrode of the form shown a very large surface is exposed to the action of the solution, thereby affording more opportunity for the peroxide of manganese to be reduced by the nascent hydrogen.

In the action of the battery the zinc salts, which are deposited all over the negative electrode of the ordinary batteries, are only deposited at the lower edge of the cylindrical cup, thereby leaving all the surface of the said cup except the lower edge exposed to action.

By practically testing my invention hereinbefore described, I have discovered, under like circumstances, that it has greater endurance than any other agglomerate battery known to me, and I have also discovered, by the employment of a galvanometer, that the polarization of the battery is much less than heretofore, and I attribute the slow polarizing of my battery mainly to the fact that a certain quantity of air is inclosed within the cup B when it is placed in position within the jar, and also to the peculiar form of the negative electrode.

It is well known that one volume of oxygen and two of hydrogen unite to form water under the action of electricity, and hence it can be concluded that the oxygen of the air inclosed within the cup B, being prevented from escaping by the air-tight insulating bushing or sleeve $b$, fitting into the cover of the said cup, unites with the polarizing hydrogen to form water during the action of the battery.

I claim—

1. In an electric battery, the negative electrode consisting of a carbon cup provided with a cover integral with it, the said cover having an opening for the reception of the positive electrode, and being extended over the edge of the jar to support the cup, substantially as described.

2. An electric battery consisting of a glass jar, a cup and cover attached thereto forming the negative electrode, and an insulating bushing or sleeve placed in the cover, and a positive electrode supported by the said insulating bushing or sleeve, substantially as described.

3. The agglomerated cup B, provided with a cover integral with it, the said cover having an opening, combined with the insulating bushing or sleeve $b$, supporting the positive electrode $d$, the said insulating bushing or sleeve fitting air-tight into the said opening, substantially as described.

4. The cup B, its cover C, and flange $a'$, combined with the screw $d'$, extended through the said flange to form a locking device for the negative electrode, substantially as described.

5. In an agglomerate battery, the cup B, cover C, and binding-post $d'$, combined with the zinc rod $d$ and the zinc plate $e$, substantially as described.

In testimony whereof I have signed my name to this specification in the presence of two subscribing witnesses.

CHARLES W. HOLTZER.

Witnesses:
J. H. CHURCHILL,
B. J. NOYES.